United States Patent Office 3,007,851
Patented Nov. 7, 1961

3,007,851
SEPARATING DIMETHYL BUTANE FROM METHYL PENTANE
Robert C. Binning, Galveston, Tex., assignor, by mesne assignments, to Standard Oil Company, Chicago, Ill., a corporation of Indiana
No Drawing. Filed Feb. 25, 1958, Ser. No. 717,318
10 Claims. (Cl. 202—42)

This invention relates to the separation of dimethyl butane from methyl pentane, and it particularly concerns the use of azeotropic distillation for effecting the separation.

The separation of dimethyl butane from methyl pentane by conventional fractional distillation is exceedingly difficult because of the closeness of boiling points of these compounds. For example, 2,3-dimethyl butane (diisopropyl) has a boiling point of 136.4° F. and 2-methyl pentane has a boiling point of 140.5° F. Both dimethyl butanes, i.e. 2,2-dimethyl butane (neohexane) and 2,3-dimethyl butane have excellent antiknock qualities, whereas both of the methyl pentanes, i.e. 2-methyl pentane and 3-methyl pentane are poor by comparison in this respect. 2,3-dimethyl butane has an octane number of 103 F–1 clear; 2,2-dimethyl butane has an octane number of 92 F–1 clear; 2-methyl pentane has an octane number of 73.4 F–1 clear; and 3-methyl pentane has an octane number of 74.5 F–1 clear. Separating either or both of the dimethyl butanes from a portion or all of the methyl pentanes would provide petroleum refiners with a means for improving the antiknock qualities of gasoline. An economical method for effecting such a separation would permit its use with hexane isomerization facilities and reduce costs of the isomerization process.

An object of the present invention is to provide a process for separating dimethyl butane from a mixture thereof with a methyl pentane. Another object is to provide a process for separating a mixture of hexane isomers containing at least one dimethyl butane and at least one methyl pentane into a fraction having a higher octane number and a fraction having a lower octane number, the higher octane fraction being enriched in dimethyl butane. A further object is to provide a process for recovering substantially pure dimethyl butane from a mixture of dimethyl butane with methyl pentane (normal hexane may optionally be present in the mixture). Other objects and advantages of the invention will be more apparent from the detailed description thereof.

In accordance with the present invention a mixture of at least one dimethyl butane and at least one methyl pentane (both isomers of each may be present, and normal hexane may also be present and has no effect upon the process) are introduced into a distillation column. Tertiary butyl chloride is also introduced into the column, preferably at about the same height in the column at which the mixture of hexane isomers is introduced. The mixture within the column is azeotropically distilled and an overhead fraction is separated from a bottoms fraction. The overhead fraction contains the dimethyl butane-tertiary butyl chloride azeotrope with very little if any methyl pentane, and the bottoms fraction contains the methyl pentane with very little if any dimethyl butane. The overhead fraction can then be processed to recover the dimethyl butane-rich hydrocarbons from the tertiary butyl chloride.

As was indicated, the charge mixture which can be processed in accordance with this invention may be a mixture of either 2,3-dimethyl butane and/or 2,2-dimethyl butane with 2-methyl pentane and/or 3-methyl pentane. n-Hexane may be present in the mixture, and when it is it will be concentrated in the bottoms fraction along with the methyl pentane. Hydrocarbon fractions of petroleum origin are the usual charge stock to this invention. The charge stock, due to poor fractionation, may contain minor amounts of higher boiling hydrocarbons such as heptanes and/or lower boiling hydrocarbons such as pentanes (but it is preferred to substantially exclude them by more precise prefractionation). Such compounds may be separated by distillation from the bottoms and/or the dimethyl butanes-rich hydrocarbons, recovered from the overhead if desired. Thus a charge stock consisting essentially of $C_6$ paraffins, i.e. isomeric hexanes (minor amounts of pentanes, heptanes, olefins and impurities may be present) is used.

The invention is useful in concentrating or separating the dimethyl butanes present in the hexane fractions of virgin naphtha, reformed naphtha, isomerized light naphthas and the like. Processes which isomerize normal hexanes and methyl pentanes to dimethyl butanes employing noble and non-noble catalysts ordinarily produce a mixture of dimethyl butanes and methyl pentanes (usually also containing normal hexane). The concentration of dimethyl butanes in the product depends to a great extent upon the isomerization temperature due to the chemical equilibria involved. Isomerization processes such as use a platinum or other metal carried upon a support and employ temperatures of from 500 to 800° F. or thereabouts produce a product containing lower concentrations of dimethyl butanes and higher concentrations of methyl pentanes and normal hexane than do isomerization processes using lower temperatures on the order of 250° F. or below such as is used when employing an aluminum-chloride hydrocarbon complex catalyst as in the Isomate Process. The isomerized hexane product from such processes, and particularly from the former process because of its lower octane number, can be charged to the process of this invention to separate it into a fraction enriched in dimethyl butanes and a fraction depleted in dimethyl butanes. The first fraction will have an improved octane number and is an excellent blending stock for gasoline, and the second fraction (which will be rich in methyl pentanes and normal hexane) can be recycled to the isomerization process for conversion to dimethyl butane. Likewise, the once-through product from the Isomate Process can be treated in accordance with this invention, and the methyl pentane-enriched bottoms stream from the azeotropic distillation can be recycled as part of the charge to the Isomate Process. By employing this invention in combination with the Isomate Process, the latter process can be operated using shorter catalyst-hexane contact times and thereby achieve a substantial improvement in the Isomate Process.

It has been discovered that tertiary butyl chloride is excellent for effecting the separation desired. Azeotroping with dimethyl butane greatly increases the volatility of the latter hydrocarbon and enables a sharp separation from the methyl pentanes during fractionation. The azeotrope between tertiary butyl chloride and dimethyl butane contains a large quantity of dimethyl butane and thus facilitates high hydrocarbon throughput through the fractionating column. Other agents which azeotrope with dimethyl butane provide no better separation between dimethyl butane and methyl pentane than would be obtained by fractional distillation without such agent. This is the case when using methylal. If methyl formate (which azeotropes with dimethyl butane) is used the fractional distillation, the separation between dimethyl butane and methyl pentane is even poorer than would be obtained if the methyl formate were not employed during the distillation. Predictability of the effect of a given azeotropic agent, is in view of the above, not possible.

In carrying out the azeotropic distillation of the charge isomeric hexanes (charge isomeric hexanes is understood to mean one or both of the dimethyl butanes and one or both of the methyl pentanes, with or without normal hexane) with the tertiary butyl chloride, the isomeric hexanes and tertiary butyl chloride are introduced into a distillation column at some intermediate height therein. The tertiary butyl chloride is preferably introduced into the column at about the same height therein as the isomeric hexanes are introduced. The azeotroping agent may be premixed with the isomeric hexanes and then introduced into the column. Ordinarily, between about one-half to two volumes of tertiary butyl chloride are introduced into the column per volume of the dimethyl butanes present in the charge mixture of isomeric hexanes introduced into the column. Satisfactory separation of the dimethyl butane can be obtained by employing a ratio of about 1 to 1½ volumes of tertiary butyl chloride per volume of dimethyl butanes in the charge isomeric hexane mixture. In general, the higher the ratio of tertiary butyl chloride to dimethyl butane, the greater is the recovery of dimethyl butane in the overhead. It is obvious that the ratio of tertiary butyl chloride to dimethyl butane in the charge mixture may be varied considerably depending upon the amount and concentration of dimethyl butane desired in the overhead. Conventional azeotropic distillation equipment and operating techniques are employed. Distillation columns of 30 or less to 60 or more theoretical plates may be used. By suitable adjustment of the conditions high purity dimethyl butane, i.e. 95% or higher concentration of dimethyl butane, can be made. The reflux ratio may be varied considerably, e.g. from 5:1 or less to 50:1 or more. A reflux ratio of 10:1 is quite satisfactory. Generally speaking, the higher the reflux ratio which is employed, the greater will be the concentration of dimethyl butane in the hexanes taken overhead and the greater will be the percentage of dimethyl butanes in the charge which is taken overhead. As concerns the proportion of the charged tertiary butyl chloride and isomeric hexanes which is taken overhead, the larger the amount taken overhead the greater is the recovery of dimethyl butane in the overhead product; but under such circumstances the concentration of dimethyl butane in the hydrocarbons taken overhead is obviously somewhat lower than would be the case if a lower proportion were taken overhead. Usually a balance between the concentration of dimethyl butane in the overhead hydrocarbons and the extent of recovery of dimethyl butane in the overhead is selected in accordance with the desires of the particular operator. Suitable results are obtained by removing as overhead in the distillation that portion of the introduced tertiary butyl chloride and isomeric hexanes which equals approximately the sum of the volume of introduced tertiary butyl chloride plus about 90% of the volume of dimethyl butane in the charge isomeric hexane mixture. The particular number of theoretical plates, reflux ratio, ratio of tertiary butyl chloride to dimethyl butane in the charge, portion of the total charge taken overhead, temperature of the overhead portion, etc. can be varied according to the desires of the particular operator in producing the purity of dimethyl butane desired in the overhead hydrocarbons and the extent of recovery of dimethyl butane desired.

The overhead stream of tertiary butyl chloride and dimethyl butane is thereafter processed by any suitable technique to recover the dimethyl butane from the tertiary butyl chloride. Because the amount of tertiary butyl chloride employed in the azeotropic distillation will ordinarily be more than about one volume per volume of dimethyl butane in the isomeric hexane mixture charged, the overhead will not consist exactly of the azeotropic compositon of tertiary butyl chloride with the dimethyl butane. The amount of tertiary butyl chloride in excess of the azeotropic composition will also pass off with the overhead. A minor amount, the particular amount depending upon the particular distillation conditions employed, of methyl pentane will be present in the dimethyl butane taken overhead. A suitable technique for recovering the dimethyl butane enriched hydrocarbons from the overhead consists of refluxing the overhead wtih added water to hydrolyze the tertiary butyl chloride to tertiary butyl alcohol, thereby forming distinct hydrocarbon and aqueous alcohol phases which can be separated. The tertiary butyl alcohol can be reacted with concentrated HCl to regenerate the tertiary butyl chloride for reuse in the azeotropic distillation. Another method for separating the hydrocarbons from the tertiary butyl chloride in the overhead consists of contacting the overhead at a temperature such as 500–700° F. with or without a catalyst to effect dehydrohalogenation of the tertiary butyl chloride to form isobutylene and HCl therefrom. The HCl and isobutylene may be readily separated by fractionation from the isomeric hexanes. Isobutylene and HCl can then be reacted at temperatures of 50–150° F. without a catalyst or with a catalyst such as bleaching clay or the like whereupon the tertiary butyl chloride is formed and may be recycled to the azeotropic distillation.

A number of experiments were carried out which are illustrative of the present invention. In the first set of experiments, results of which are shown in Table 1, a 50—50 volume mixture of 2,3-dimethylbutane and 2-methyl pentane was charged together with an excess of the azeotroping agent for the dimethyl butane to a 3 ft. Hypercal column operating at a 50:1 reflux ratio. Refluxing was carried out for about 8 hours and then a small sample was removed overhead and analyzed. This technique was followed while employing several azeotroping agents for the dimethyl butane. For comparative purposes, the work was repeated without any added azeotroping agent. The relative separation efficiency, as indicated by the composition of the overhead, for the various experiments is shown in Table I which follows:

Table 1

| Azeotroping Agent | Composition, Vol. Percent [1] | |
|---|---|---|
| | Charge | Overhead |
| tert.-Butyl chloride | 50% 2,3-Dimethyl butane; 50% 2-Methyl pentane. | 98.5% 2,3-Dimethyl butane; 1.5% 2-Methyl pentane. |
| Methyl formate | ----do---- | 63.9% 2,3-Dimethyl butane; 36.1% 2-Methyl pentane. |
| Methylal | ----do---- | 89.9% 2,3-Dimethyl butane; 10.1% 2-Methyl pentane. |
| None | ----do---- | 89.4% 2,3-Dimethyl butane; 10.6% 2-Methyl pentane. |

[1] Composition on an azeotroping agent-free basis.

While excellent separation is obtained when using tertiary butyl chloride as the azeotroping agent, it is apparent that the use of methylal as the azeotroping agent results in no better a separation than occurs by ordinary fractionation, and straight fractionation produces better results than are obtained by the use of methyl formate as the azeotroping agent.

An isomeric hexane mixture typical of that produced by an isomerization process operating at a temperature of about 600–800° F. using a platinum type catalyst was employed as a charging stock in another series of experiments. A standard one inch diameter Oldershaw column containing 85 plates was used. A 10:1 reflux ratio was employed. Tertiary butyl chloride was charged premixed with the isomeric hexanes to the fifteenth plate from the bottom of the column, while using a volumetric ratio of tertiary butyl chloride to dimethyl butanes in the charge of 1.4:1. The temperature of the overhead was 119° F., the feed plate temperature 137° F., and the pot temperature was 147° F. The portion of the charged tertiary butyl chloride and isomeric hexanes which was taken overhead was 36 volume percent. On a tertiary butyl chloride-free basis this amounted to 17 volume percent as compared to 18.8 volume percent dimethyl butanes in the charge isomeric hexane mixture. Four 30-minute samples of overhead and bottoms obtained under lined-out conditions were composited for analysis. The composition of the charge mixture to the azeotropic distillation and the compositions of the overhead and bottoms are shown in Table 2 which follows:

*Table 2*

| Component | Composition, Vol. Percent | | |
|---|---|---|---|
| | Charge | Overhead | Bottoms |
| 2,2-Dimethyl butane | 8.1 (10.3)a | 26.3 (70.7)a | |
| 2,3-Dimethyl butane | 6.7 (8.5)a | 9.9 (26.6)a | 2.5 |
| 2-Methyl pentane | 26.6 (33.8)a | 0.9 (2.4)a | 40.6 |
| 3-Methyl pentane | 20.1 (25.5)a | 0.1 (.3)a | 29.4 |
| n-Hexane | 17.3 (21.9)a | | 27.2 |
| t-Butyl chloride | 21.2 | 62.8 | 0.3 | a On a tert-butyl chloride free basis.
97+ vol. percent dimethyl butanes in overhead hydrocarbon product.
88 vol. percent of available dimethyl butanes recovered in overhead.

The increase from 18.8% dimethyl butanes in the charge isomeric hexane mixture of 97+ volume percent dimethyl butanes in the overhead hydrocarbon product illustrates the excellent separation obtainable by the process of this invention. High yields are also obtained as evidenced by the 88 volume percent recovery of dimethyl butanes in the overhead. Calculations based upon fractional distillation of such a charge isomeric hexane mixture in the absence of tertiary butyl chloride determined that it would be necessary to use more than 270 Oldershaw plates at the higher reflux ratio of 25:1 in order to attain approximately the same concentration of dimethyl butanes in the overhead, and even under these extreme conditions a lesser amount, i.e. 77 volume percent versus 88 volume percent of dimethyl butanes are recovered in the overhead.

While the invention has been described with reference to certain specific examples, it is to be understood that it is not limited thereto but includes within its scope such modifications as would be apparent to those skilled in this art.

What is claimed is:

1. A process for separating dimethyl butane from methyl pentane which comprises introducing into a distillation column tertiary butyl chloride and a charge mixture consisting essentially of isomeric hexanes which contains at least dimethyl butane and methyl pentane, distilling the mixture of tertiary butyl chloride and isomeric hexanes, taking overhead from the distillation column an azeotrope of tertiary butyl chloride and dimethyl butane, and removing from the distillation column a methyl pentane-containing bottoms fraction having a lower dimethyl butane concentration than the charge mixture.

2. The process of claim 1 wherein tertiary butyl chloride and the charge mixture of isomeric hexanes are introduced into the distillation column at approximately the same height.

3. The process of claim 1 wherein tertiary butyl chloride is introduced into the distillation column in an amount between about one-half to two volumes per volume of dimethyl butane present in the charge mixture of isomeric hexanes introduced into the distillation column.

4. The process of claim 1 wherein the portion of the introduced tertiary butyl chloride and isomeric hexanes which is taken overhead equals approximately the sum of the volume of introduced tertiary butyl chloride plus about 90% of the volume of the dimethyl butane in the introduced isomeric hexane mixture.

5. The process of claim 1 wherein high purity dimethyl butane is recovered from the overhead from the distillation column.

6. The process fo claim 1 wherein the charge mixture consists essentially of 2,2-dimethyl butane, 2,3-dimethyl butane, 2-methyl pentane, 3-methyl pentane, and n-hexane.

7. The process of claim 6 wherein the charge mixture is obtained from the products of isomerization of a light petroleum fraction.

8. A process for separating at least one dimethyl butane selected from the group consisting of 2,2-dimethyl butane and 2,3-dimethyl butane from an admixture thereof with a methyl pentane composition selected from the group consisting of 2-methyl pentane, 3-methyl pentane, mixture thereof, and mixtures of at least one of said methyl pentanes with n-hexane, which comprises azeotropically distilling said admixture of isomeric hexanes with tertiary butyl chloride, separating an overhead fraction of tertiary butyl chloride and isomeric hexanes enriched in dimethyl butane from a methyl pentane-containing bottoms fraction of reduced dimethyl butane concentration, and recovering the isomeric hexanes in the overhead fraction from the tertiary butyl chloride.

9. A process for separating a dimethyl butanes-enriched $C_6$ paraffin fraction from a $C_6$ paraffin charge mixture containing dimethyl butanes and methyl pentanes which comprises introducing tertiary butyl chloride and the $C_6$ paraffin charge mixture into a distillation column, the tertiary butyl chloride being introduced in an amount between about 1.0 and 1.5 volumes per volume of dimethyl butanes in the introduced $C_6$ paraffin charge mixture, distilling the resultant admixture of tertiary butyl chloride and $C_6$ paraffin charge mixture, removing from the distillation column an overhead fraction of tertiary butyl chloride and $C_6$ paraffins, the $C_6$ paraffins in the overhead having a greater concentration of dimethyl butanes than is contained in the $C_6$ paraffin charge mixture, the portion of the introduced tertiary butyl chloride and $C_6$ paraffins which is taken overhead being approximately equal to the sum of the volume of introduced tertiary butyl chloride plus about 90% of the volume of dimethyl butanes in the introduced $C_6$ paraffin charge mixture, removing from the distillation column a bottoms stream of $C_6$ paraffins having a lower concentration of dimethyl butanes than the $C_6$ paraffin charge mixture, and recovering a dimethyl butanes-enriched $C_6$ paraffin fraction from the overhead stream removed from the distillation column.

10. A process for separating 2,2-dimethyl butane from an admixture thereof with methyl pentane which comprises azeotropically distilling said admixture of isomeric hexanes with tertiary butyl chloride, separating an overhead fraction of tertiary butyl chloride and isomeric hexanes enriched in 2,2-dimethyl butane from a methyl pentane-containing bottoms fraction of reduced 2,2-dimethyl butane concentration, and separating the 2,2-dimethyl butane-enriched isomeric hexanes in the overhead fraction from the tertiary butyl chloride.

References Cited in the file of this patent

UNITED STATES PATENTS

| 2,368,050 | Tooke | Jan. 23, 1945 |
| 2,395,022 | Sutton et al. | Feb. 19, 1946 |
| 2,425,861 | Brown et al. | Aug. 19, 1947 |
| 2,428,815 | Sandberg et al. | Oct. 14, 1947 |
| 2,692,227 | Cines | Oct. 19, 1954 |

OTHER REFERENCES

Horsley: "Azeotropic Data," 1952, p. 122.